US009870725B2

United States Patent
Lin et al.

(10) Patent No.: US 9,870,725 B2
(45) Date of Patent: Jan. 16, 2018

(54) TRANSMISSION INTERFACE, TRANSMISSION METHOD, AND DRIVING CIRCUIT THEREOF, AND DISPLAY DEVICE AND ELECTRONIC DEVICE

(71) Applicant: SITRONIX TECHNOLOGY CORP., Hsinchu County (TW)

(72) Inventors: Tsun-Sen Lin, Hsinchu County (TW); Min-Nan Liao, Hsinchu County (TW)

(73) Assignee: Sitronix Technology Corp., Hsinchu County (TW)

( * ) Notice: Subject to any disclaimer, the term of this patent is extended or adjusted under 35 U.S.C. 154(b) by 0 days.

(21) Appl. No.: 13/982,545

(22) PCT Filed: Jan. 18, 2013

(86) PCT No.: PCT/CN2013/000052
§ 371 (c)(1),
(2) Date: Jul. 30, 2013

(87) PCT Pub. No.: WO2013/107286
PCT Pub. Date: Jul. 25, 2013

(65) Prior Publication Data
US 2014/0049525 A1    Feb. 20, 2014

Related U.S. Application Data

(60) Provisional application No. 61/588,222, filed on Jan. 19, 2012.

(51) Int. Cl.
*G09G 3/02* (2006.01)
*G06F 3/14* (2006.01)

(52) U.S. Cl.
CPC .............. *G09G 3/02* (2013.01); *G06F 3/14* (2013.01); *G09G 2310/08* (2013.01); *G09G 2352/00* (2013.01)

(58) Field of Classification Search
CPC ............ G06F 3/1431; G06F 3/14; G09G 3/02
(Continued)

(56) References Cited

U.S. PATENT DOCUMENTS 5,200,925 A * 4/1993 Morooka .................. 365/219
2002/0167851 A1  11/2002 Ishida et al.
(Continued)

FOREIGN PATENT DOCUMENTS

CN       1841489 A    10/2006
CN     101894089 A    11/2010
(Continued)

*Primary Examiner* — Sepehr Azari
(74) *Attorney, Agent, or Firm* — Rosenberg, Klein & Lee

(57) ABSTRACT

The present invention relates to a transmission interface. A display device comprises a driving circuit and a transmission interface. The transmission method of the transmission interface is that a first input is used for receiving a first data string; a second input is used for receiving a second data string; and the processing unit receives the first and second data strings. The first data string has a first identification bit and a plurality of first information bits. The second data string has a plurality of second information bits. The processing unit identifies either to write a plurality of parameters or a plurality of data to a storage circuit or to read the stored content from the storage circuit according to the first identification bit and the plurality of first information bits. The processing circuit further writes or reads the storage circuit according to the plurality of second information bits.

26 Claims, 16 Drawing Sheets

(58) Field of Classification Search
USPC .......................................................... 345/204
See application file for complete search history.

(56) References Cited

U.S. PATENT DOCUMENTS

2006/0214902 A1* 9/2006 Tamura ........................ 345/100
2008/0196047 A1   8/2008 Kim et al.
2011/0225325 A1   9/2011 Nomura et al.

FOREIGN PATENT DOCUMENTS

| CN | 102096650 A | 6/2011 |
| CN | 102193884 A | 9/2011 |
| TW | 250416 B | 3/2006 |
| TW | M322032 A | 11/2007 |
| TW | 200816635 A | 4/2008 |
| TW | 200919261 A | 5/2009 |

* cited by examiner

TRANSMISSION INTERFACE, TRANSMISSION METHOD, AND DRIVING CIRCUIT THEREOF, AND DISPLAY DEVICE AND ELECTRONIC DEVICE

FIELD OF THE INVENTION

The present invention relates generally to a transmission interface, a transmission method, and the driving circuit thereof, and to a display device and an electronic device, and particularly to a transmission interface, a transmission method, and the driving circuit thereof, and to a display device and an electronic device capable of identifying data types and transmitting bulk data rapidly.

BACKGROUND OF THE INVENTION

Liquid crystal displays are a kind of flat panel display having the advantages of low radiation, small size, and low power consumption. They have gradually replaced traditional cathode ray tube displays and extensively applied to information products such as notebook computers, personal digital assistants (PDAs), flat TVs, or mobile phones. General flat panel displays include thin film transistor (TFT) liquid crystal displays, low temperature polysilicon (LTPS) liquid crystal displays, and organic light emitting diode (OLED) displays. The driving system of a display is composed by a timing controller, a plurality of source drivers, and a plurality of gate drivers.

In addition, the communication of the driving system of a display with the outside is done through a control circuit. The control circuit will transmit a control parameter and a plurality of display data to the driving system according to the external information for controlling the plurality of source and gate drivers of the driving system to produce the corresponding driving signals and thus driving a display panel to generate images. Nonetheless, in a general display, when the serial transmission interface is used between the control circuit and the driving system, there is only one transmission line for transmitting the control parameter and the display data. Thereby, it takes a long time to transmit data between the control circuit and the driving system. Moreover, today, the size of displays becomes larger increasingly, it makes the time required for data transmission between the control circuit and the driving system even longer and affecting the displaying efficiency of displays. One way to solve the problem is to adopt the parallel interface. However, it will increase the pin counts of the transmission interface, disallowing simplification of the mechanisms of display modules.

Accordingly, the present invention provides a novel transmission interface, transmission method, and the driving circuit thereof and a display device and an electronic device. According to the present invention, the time for data transmission can be saved, which further enhances the efficiency for data transmission while using only few transmission lines. Thereby, the mechanism can be simplified, and thus increasing the convenience and flexibility in module designs. The problems described above can be solved.

SUMMARY

An objective of the present invention is to provide a transmission interface, a transmission method, and the driving circuit thereof, and a display device and an electronic device. According to the present invention, a first input and a second input are used for transmitting bulk data in the same time. Thereby, the purpose of transmitting bulk data rapidly can be achieved and hence enhancing the transmission efficiency.

Another objective of the present invention is to provide a transmission interface, a transmission method, and the driving circuit thereof, and a display device and an electronic device. According to the present invention, an address decoding unit is used for identifying the data types. In addition, two serial data lines are used for transmission, Thereby, the purpose of transmitting bulk data rapidly can be achieved.

The transmission interface according to the present invention comprises a first input, a second input, and a processing unit. The transmission method of the transmission interface is that the first input is used for receiving a first data string; the second input is used for receiving a second data string; and the processing unit receives the first and second data strings. The first data string has a first identification bit and a plurality of first information bits. The second data string has a plurality of second information bits. The processing unit identifies either to write a plurality of parameters or a plurality of data to a storage circuit or to read the stored content from the storage circuit according to the first identification bit and the plurality of first information bits. The processing circuit further writes or reads the storage circuit according to the plurality of second information bits. Thereby, a first input and a second input according to the present invention are used for transmitting bulk data in the same time for achieving the purpose of transmitting data rapidly and further improving the transmission efficiency.

Besides, the driving circuit according to the present invention comprises a transmission interface. The transmission interface has a first input and a second input. The first input receives a first data string; the second input receives a second data string. The first data string has a first identification bit and a plurality of information bits. The second data string has a plurality of second information bits. The transmission interface identifies either to write a plurality of parameters or a plurality of data to a storage circuit or to read the stored content from the storage circuit according to the first identification bit and the plurality of first information bits. The transmission interface further writes or reads the storage circuit according to the plurality of second information bits.

Moreover, the transmission method according to the present invention comprises steps of transmitting a first identification bit and a plurality of first information bits of a first data string to a transmission interface; transmitting a plurality of second information bits of a second data string to the transmission interface; identifying either to write a plurality of parameters or a plurality of data to a storage circuit or to read the stored content from the storage circuit according to the first identification bit and the plurality of first information bits; and writing or reading the storage circuit according to the plurality of second information bits.

In addition, the display device according to the present invention comprises a driving circuit and a transmission interface. The driving circuit drives the display device. The transmission interface has a first input and a second input. The first input receives a first data string; the second input receives a second data string. The first data string has a first identification bit and a plurality of information bits. The second data string has a plurality of second information bits. The transmission interface identifies either to write a plurality of parameters or a plurality of data to a storage circuit or to read the stored content from the storage circuit according to the first identification bit and the plurality of first information bits. The transmission interface further writes or reads the storage circuit according to the plurality of second information bits.

Furthermore, the electronic device according to the present invention comprises a main processor, a driving circuit, and a transmission interface. The main processor produces a first data string and a second data string. The driving circuit drives a display panel according to the first and second data strings. The transmission interface has a first input and a second input. The first input receives the first data string; the second input receives the second data string. The first data string has a first identification bit and a plurality of information bits. The second data string has a plurality of second information bits. The transmission interface identifies either to write a plurality of parameters or a plurality of data to a storage circuit or to read the stored content from the storage circuit according to the first identification bit and the plurality of first information bits. The transmission interface further writes or reads the storage circuit according to the plurality of second information bits.

DETAILED DESCRIPTION

In the specifications and subsequent claims, certain words are used for representing specific devices. A person having ordinary skill in the art should know that hardware manufacturers might use different nouns to call the same device. In the specifications and subsequent claims, the differences in names are not used for distinguishing devices. Instead, the differences in functions are the guidelines for distinguishing. In the whole specifications and subsequent claims, the word "comprising" is an open language and should be explained as "comprising but not limited to". Beside, the word "couple" includes any direct and indirect electrical connection. Thereby, if the description is that a first device is coupled to a second device, it means that the first device is connected electrically to the second device directly, or the first device is connected electrically to the second device via other device or connecting means indirectly.

In order to make the structure and characteristics as well as the effectiveness of the present invention to be further understood and recognized, the detailed description of the present invention is provided as follows along with embodiments and accompanying figures.

Figure 1:
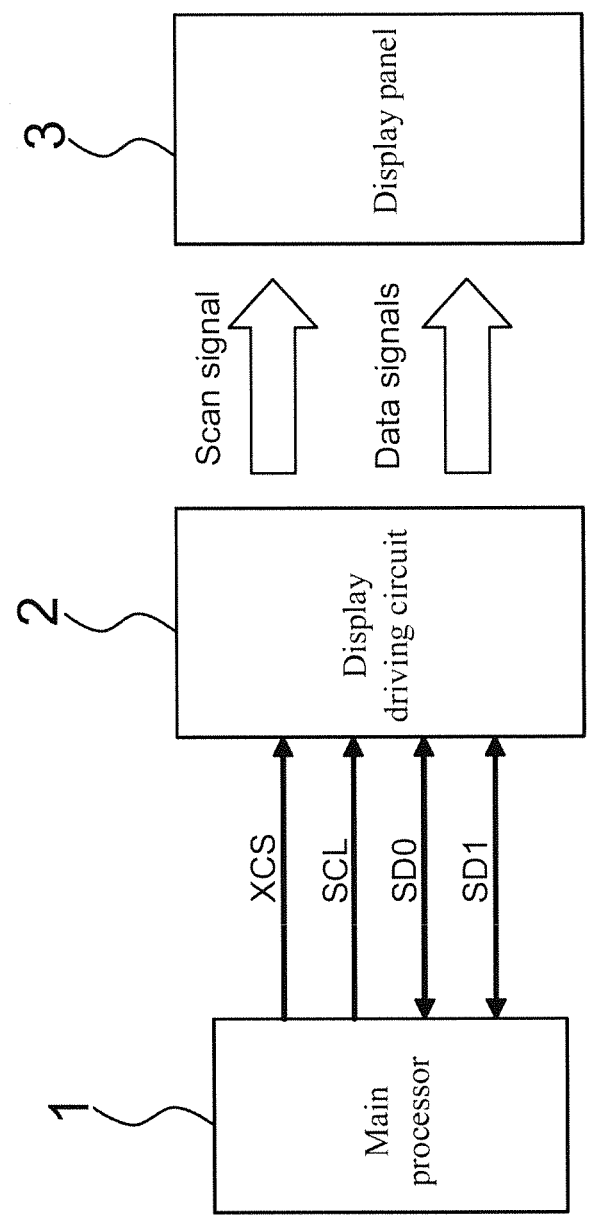
FIG. 1 shows a schematic diagram of the driving architecture of the display device according an embodiment of the present invention.

FIG. 1 shows a schematic diagram of the driving architecture of the display device according an embodiment of the present invention. As shown in the figure, the driving architecture of the display device according to the present embodiment comprises a main processor 1, a display driving circuit 2, and a display panel 3. The main processor 1 is the circuit inside an electronic device such as a computer, a handheld device, or a mobile communication device. According to the images to be displayed on the display device, the main processor 1 controls the display driving circuit 2 to drive the display panel 3 to display the images. For example, the display device is connected to an electronic device such as a computer system. When the computer system is to play a movie, the main processor 1 will transmit the images to the display driving circuit 2 for driving the display panel 3 to display the images.

The main processor 1 is coupled to the display driving circuit 2. According to the present embodiment, there are four transmission lines between the main processor 1 and the display driving circuit 2, including an enable line XCS, a clock line SCL, a first transmission line SD0, and a second transmission line SD1. The main processor 1 produces an enable signal and transmits the enable signal to the display driving circuit 2 via the enable line XCS for enabling the display driving circuit 2. The main processor 2 generates a clock signal and transmits the clock signal to the display driving circuit via the clock line SCL. The main processor 1 produces at least a control parameter and a control parameter address or a plurality of display data and a display data address, and transmits the control parameter or the plurality of display data to the display driving circuit 2 according to the clock signal, the control parameter address or the display data address via the first and second transmission lines SD0, SD1, and thus further controlling the display driving circuit 2 to drive the display panel 3.

The display driving circuit 2 produces a scan signal and a plurality of data signals to the display panel 3 according to the control parameter and the plurality of display data for driving the display panel 3 to display the images.

Figure 2:
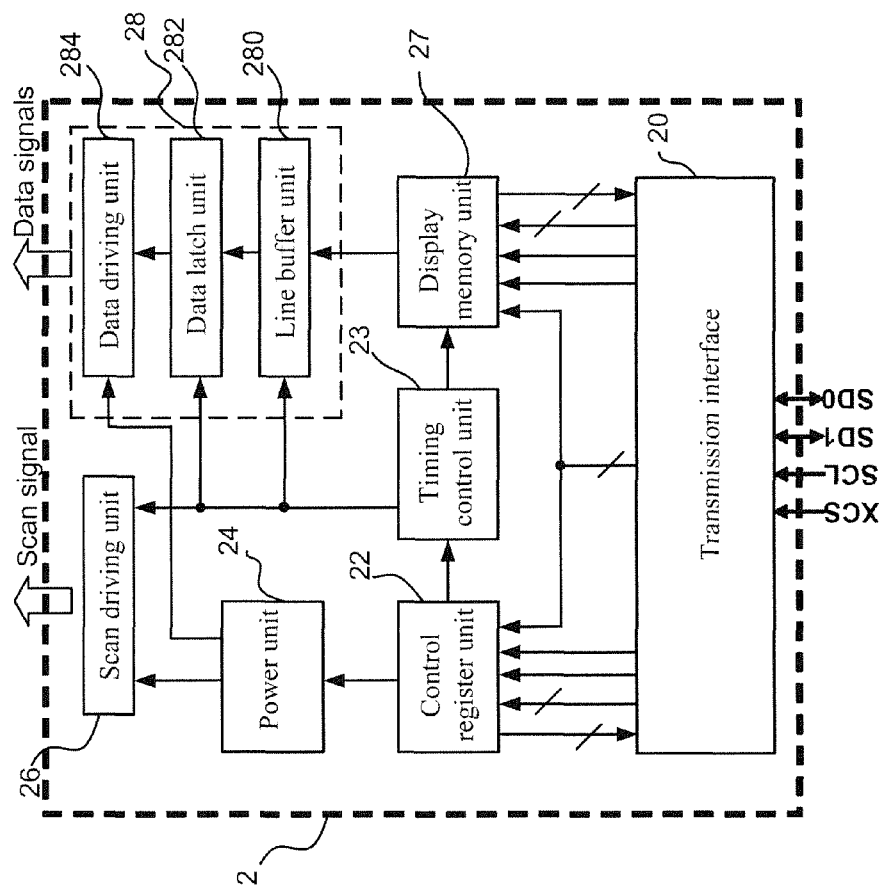
FIG. 2 shows a block diagram of the display driving circuit according to an embodiment of the present invention.

FIG. 2 shows a block diagram of the display driving circuit according to an embodiment of the present invention. As shown in the figure, the display driving circuit 2 according to the present embodiment comprises a transmission interface 20, a control register unit 22, a timing control unit 23, a power unit 24, a scan driving unit 26, a display memory unit 27, and a data driving module 28. The transmission interface 20 is coupled to the main processor 1. Besides, there are four transmission lines between the transmission interface 20 and the main processor 1, namely, the enable line XCS, the clock line SCL, the first transmission line SD0, and the second transmission line SD1. The transmission interface according to the present invention is serial peripheral interface (SPI). In other words, the transmission interface 20 comprises a first input and a second input, which are coupled to the first and second transmission lines SD0, SD1, respectively, for receiving serial data. The first input is used for receiving a first data string transmitted by the first transmission line SD0; the second input is used for receiving a second data string transmitted by the second transmission line SD1. The first data string has a first identification bit and a plurality of first information bits; the second data string has a plurality of information bits. The transmission interface 20 identifies either to write a plurality of parameters or a plurality of data to a storage circuit or to read the stored content from the storage circuit according to the first identification bit and the plurality of first information bits. The transmission interface further writes or reads the storage circuit according to the plurality of second information bits. The storage circuit comprises the control register unit 22 and the display memory unit 27. Because the transmission interface according to the present embodiment can be applied to the field of display panels, the plurality of parameters and the plurality of data described above are equivalent to the plurality of control parameters and the plurality of display data. The plurality of first information bits includes the control parameter address or the display data address. In addition, the plurality of first and second information bits include the control parameter or the display data in other cycles. Nonetheless, the transmission interface according to the present invention is not limited to be applied to the field of display panels; it can also be applied to any other electronic device requiring a transmission interface.

Beside, the second data string further comprises a second identification bit. The transmission interface 20 identifies the plurality of second information bits as the plurality of parameters or the length of the plurality parameters, namely, the plurality of control parameters or the length of the plurality of control parameters, according to the second identification bit.

Accordingly, the transmission interface 20 transmits to the control register unit 22 and the display memory unit 27, respectively, according to control parameter, the control parameter address, or the plurality of display data and the display data address transmitted by the first and second transmission lines SD0, SD1.

The control register unit 22 is coupled to the transmission interface 20. It stores the control parameter according to the control parameter address transmitted by the transmission interface 20 and produces a first control signal and a second control signal. The timing control unit 23 is coupled to the control register unit 22, and produces a timing signal according to the first control signal and transmits the timing signal to the scan driving unit 26, the display memory unit 27, and the data driving module 28 for controlling the timing of the scan driving unit 26, the display memory unit 27, and the data driving module 28. The power unit 24 is coupled to the control register unit 22. It produces a first power signal and a second power signal according to the second control signal and transmits the first and second power signals to the scan driving unit 26 and the data driving module 28, respectively. The scan driving unit 26 is coupled to the power unit 24 and the timing control unit 23. It produces a scan signal according to the timing signal and the first power signal for driving at least one of a plurality of scan lines of the display panel.

The display memory unit 27 stores the plurality of display data according to the display data address transmitted by the transmission interface 20. Then, the plurality of display data in the display memory unit 27 is read by the data driving module 28 according to the timing signal. The data driving module 28 is coupled to the power unit 24, the timing control unit 23, and the display memory unit 27. The data driving module 28 produces a plurality of data signals according to the second power signal, the timing signal, and the plurality of display data and transmits the plurality of data signals to the display panel for driving a plurality of data lines of the display panel.

In addition, the data driving module 28 comprises a line buffer unit 280, a data latch unit 282, and a data driving unit 284. The line buffer unit 280 is coupled to the display memory unit 27 and the timing control unit 23, and reads and registers the plurality of display data stored in the display memory unit 27 according to the timing signal. The data latch unit 282 is coupled to the timing control unit 23 and the line buffer unit 280, and latches the plurality of display data output by the line buffer unit 280 according to the timing signal and outputs the plurality of display data to the data driving unit 284. The data driving unit 284 is coupled to the power unit 24 and the data latch unit 282, and produces and transmits the plurality of data signals to the display panel according to the second power signal and the plurality of display data output by the data latch unit 282 for driving the plurality of data lines of the display panel.

Figure 3:
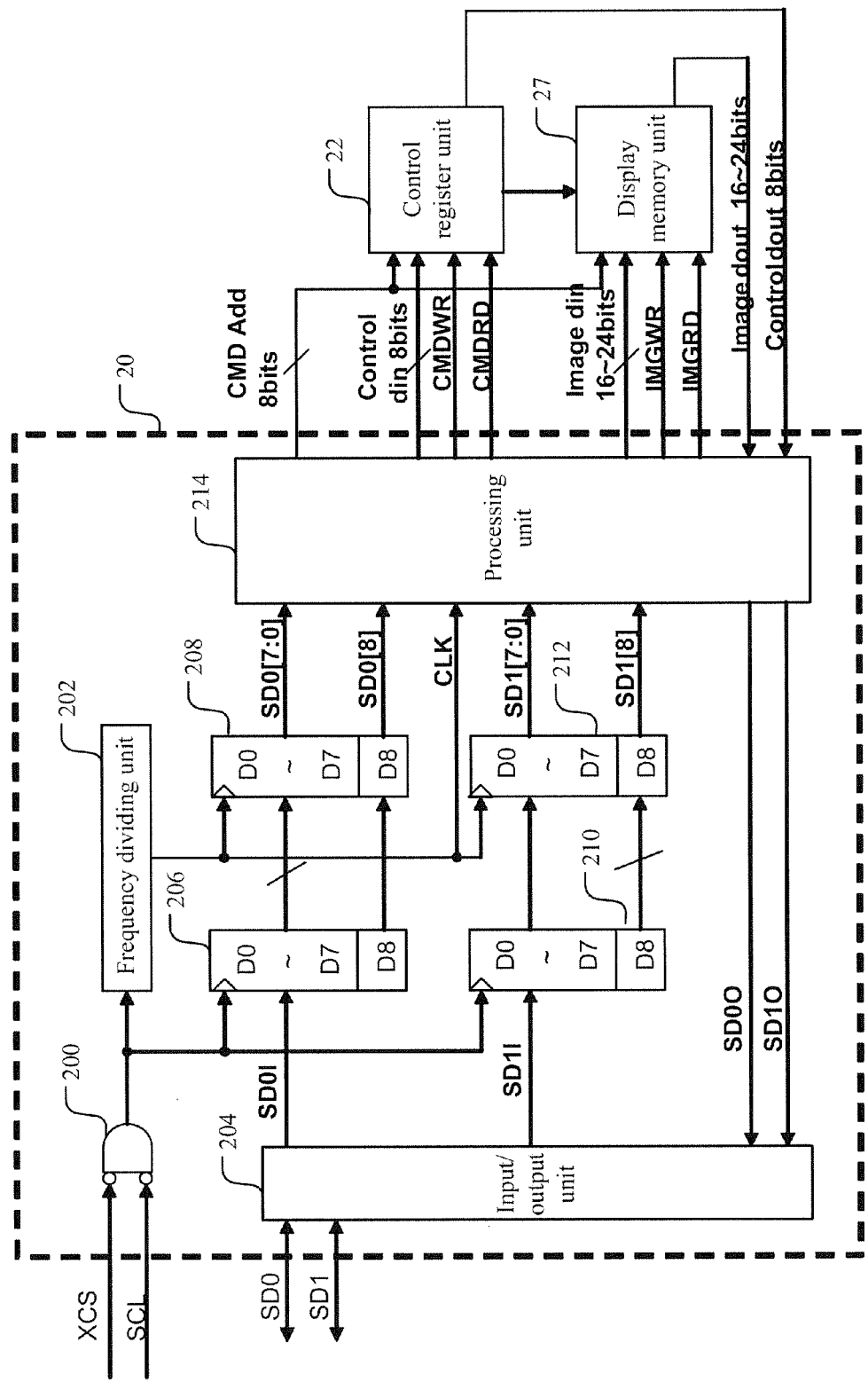
FIG. 3 shows a block diagram of the transmission interface of the display driving circuit according to an embodiment of the present invention.

FIG. 3 shows a block diagram of the transmission interface of the display driving circuit according to an embodiment of the present invention. As shown in the figure, the transmission interface 20 according to the present invention comprises a logic circuit 200, a frequency dividing unit 202, an input/output unit 204, a first shift register unit 206, a first latch unit 208, a second shift register unit 210, a second latch unit 212, and a processing unit 214.

The logic circuit 200 is coupled to the enable line XCS and the clock line SCL, and produces a second clock signal according to the enable signal of the enable line XCS and the first clock signal of the clock line SCL, and transmits the second clock signal to the frequency dividing unit 202, the first shift register unit 206, and the second shift register unit 210. According to the present embodiment, the logic circuit 200 has a first input, a second input, and an output. The first input and the second input of the logic circuit 200 receive the enable signal and the first clock signal, respectively. As the enable signal is low, for example, the logic "0", the logic circuit 200 outputs the second clock signal and transmits the second clock signal to the frequency dividing unit 202, the first shift register unit 206, and the second shift register unit 210 for controlling the timing of the frequency dividing unit 202, the first shift register unit 206, and the second shift register unit 210. Besides, the logic circuit 200 according to the present embodiment is only an embodiment. It is not limited to two inverters and one AND gate; other logic devices can be adopted.

The frequency dividing unit 202 is coupled to the logic circuit 200. It receives the second clock signal, dividing the frequency of the second clock signal, and produces a frequency dividing signal CLK, which is then transmitted to the first latch unit 208, the second latch unit 212, and the processing unit 214. According to the present embodiment, the frequency dividing unit 202 is a ⅑ frequency dividing circuit, which means the second clock signal is divided by 9 and producing the frequency dividing signal CLK. The input/output unit 204 is coupled to the first and second transmission lines SD0, SD1 for receiving the control parameter and the control parameter address or the plurality of display data and the plurality of display data address.

The first shift register unit 206 is coupled to the logic circuit 200 and the input/output unit 204. The first shift register unit 206 stores and outputs the first identification bit and the plurality of first information bits of the first data string of the first transmission line SD0 according to the second clock signal output by the logic circuit 200. Likewise, the second shift register unit 210 is coupled to the logic circuit 200 and the input/output unit 204. The second shift register unit 210 stores and outputs the second identification bit and the plurality of second information bits of the second data string of the second transmission line SD1 according to the second clock signal output by the logic circuit 200.

The first latch unit 208 is coupled to the first shift register unit 206, and latches the first identification bit and the plurality of first information bits output by the first shift register unit 206 according to the frequency dividing signal CLK. Afterwards, the first latch unit 208 further outputs the first identification bit and the plurality of first information bits to the processing unit 214 according to the frequency dividing signal CLK. Likewise, the second latch unit 212 is coupled to the second shift register unit 210, and latches the second identification bit and the plurality of second information bits output by the second shift register unit 210 according to the frequency dividing signal CLK. Afterwards, the second latch unit 212 further outputs the second identification bit and the plurality of second information bits to the processing unit 214 according to the frequency dividing signal CLK.

The processing unit 214 is coupled to the first and second latch units 208, 212, and receives the first identification bit and the plurality of first information bits of the first data string output by the first latch unit 208 and the second identification bit and the plurality of second information bits of the second data string output by the second latch unit 212 according to the frequency dividing signal CLK. The processing unit 214 determines whether to receive the control parameter or to display data afterwards according to the first identification bit, the second identification bit, the plurality of first information bits, and the plurality of second information bits. In addition, the processing unit 214 determines whether to transmit the control parameter to the control register unit 22 or to transmit the display data to the display memory unit 27 according to the plurality of first information bits. In other words, the processing unit 214 identifies either to write the plurality of control parameters or the plurality of display data to the control register unit 22 or the display memory unit 27, or to read the stored content from the control register unit 22 or the display memory unit 27 according to the first identification bit and the plurality of first information bits. The processing unit 214 further writes to or reads from the control register unit 22 or the display memory unit 27 according to the plurality of second information bits. Accordingly, the first and second inputs of the transmission interface 20 according to the present invention transmit data simultaneously to the processing unit 214. Hence, the purpose of transmitting bulk data rapidly is achieved and thus improving the transmission efficiency.

Regarding how the processing unit 214 transmits the control parameter to the control register unit 22 according to the plurality of first information bits or transmits the display data to the display memory unit 27 will be described in details below.

Figure 4:
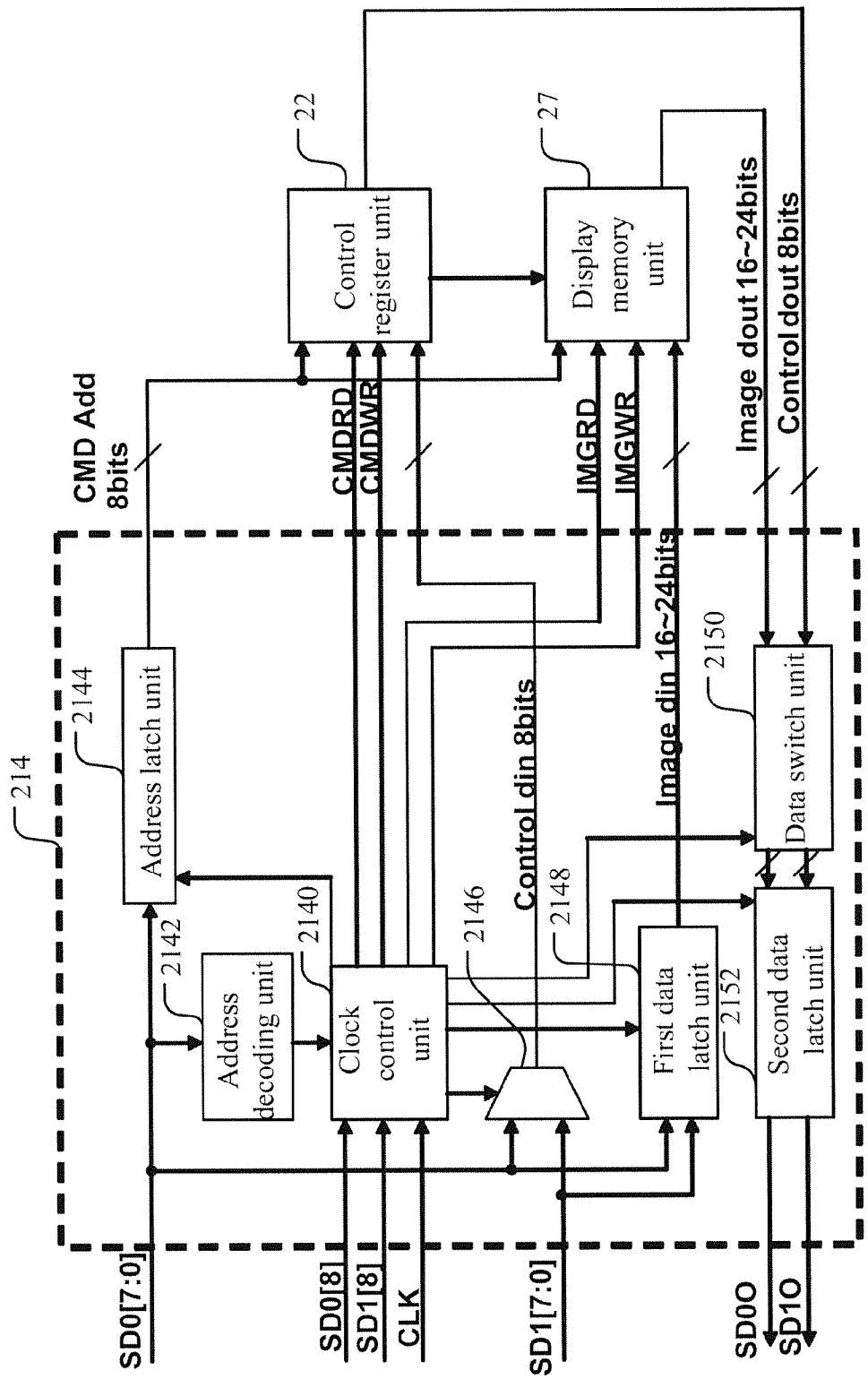
FIG. 4 shows a block diagram of the processing unit according to an embodiment of the present invention.

FIG. 4 shows a block diagram of the processing unit according to an embodiment of the present invention. As shown in the figure, the processing unit 214 according to the present embodiment comprises a clock control unit 2140, an address decoding unit 2142, an address latch unit 2144, a selection unit 2146, a first data latch unit 2148, a data switch unit 2150, and a second data latch unit 2152. The clock control unit 2140 receives the first identification bit of the first data string of the first transmission line SDO, the second identification bit of the second data string of the second transmission line SD1, and the frequency dividing signal CLIA. The address decoding unit 2142 receives the plurality of first information bits, which comprises a plurality of address bits. Thereby, the address decoding unit 2142 decodes the plurality of first information bits and produces a first decoding signal for knowing the plurality of first information bits being a parameter address or a data bit, where the first decoding signal can be transmitted via at least a signal line. Then, the address decoding unit 2142 transmits the first decoding signal to the clock control unit 2140, which knows the plurality of first information bits being a parameter address or a data address according to the first decoding signal. The address decoding unit 2142 determines writing or reading according to the first identification bit and produces a parameter read signal CMDRD, a parameter write signal CMDWR, a data read signal IMGRD, or a data write signal IMGWR correspondingly. The parameter read signal CMDRD or the parameter write signal CMDWR is transmitted to the control register unit 22 for writing the control parameter to the control register unit 22 or reading the stored control parameter from the control register unit 22. Alternatively, the data read signal IMGRD or the data write signal IMGWR is transmitted to the display memory unit 27 for controlling writing the display data to the display memory unit 27 or reading the stored display data from the display memory unit 27. Thereby, by using the address decoding unit 2142 according to the present invention to identify the data types, the purpose of transmitting data correctly can be achieved.

The address latch unit 2144 is coupled to the clock control unit 2140, and receives and transmits the plurality of first information bits to the control register unit 22 or the display memory unit 27 according to an address command signal transmitted by the clock control unit 2140. The clock control unit 2140 receives the first decoding signal and knows whether the plurality of first and second information bits transmitted by the first and second transmission lines SD0, SD1 subsequently are control parameters or display data. If they are control parameters, the clock control unit 2140 will produce a selection signal and transmit the selection signal to the selection unit 2146 for controlling the selection unit 2146 to output the control parameters to the control register unit 22. If they are display data, the clock control unit 2140 will produce a latch signal and transmit the latch signal to the first data latch unit 2148. The first data latch unit 2148 receives the latch signal, the plurality of display data transmitted by the first transmission line SD0, and the plurality of display data transmitted by the second transmission line SD1. When the display memory unit 27 receives the data write signal IMGWR, the display memory unit 27 writes the display data from the first latch unit 2144.

Moreover, when the clock control unit 2140 identifies to read the plurality of control parameters stored in the control register unit 22 or to read the plurality of display data stored in the display memory unit 27 according the first identification bit SD0[8], the clock control unit 2140 will produce and transmit a switch signal and a read signal to the data switch unit 2150 and the second data latch unit 2152, respectively, for reading the plurality of control parameters stored in the control register unit 22 or the plurality of display data stored in the display memory unit 27. For example, the clock control unit 2140 produces the parameter read signal CMDRD to the control register unit 22 for driving the control register unit 22 to output the plurality of control parameters stored therein to the data switch unit 2150. At this time, the clock control unit 2140 transmits the switch signal to the data switch unit 2150 for controlling the data switch unit 2150 to switch and output the plurality of the control parameters received to the second data latch unit 2152. Meanwhile, the clock control unit 2140 will transmit the read signal to the second data latch unit 2152 for controlling the second data latch unit 2152 to output the plurality control parameters latched therein to the main processor 1, and thus completing the action of reading the plurality of control parameters stored in the control register unit 22. Likewise, the method for reading the plurality of display data stored in the display memory unit 27 is the same as the method for reading the plurality of control parameters from the control register unit 22. Hence, the details will not be repeated again.

Figure 5:
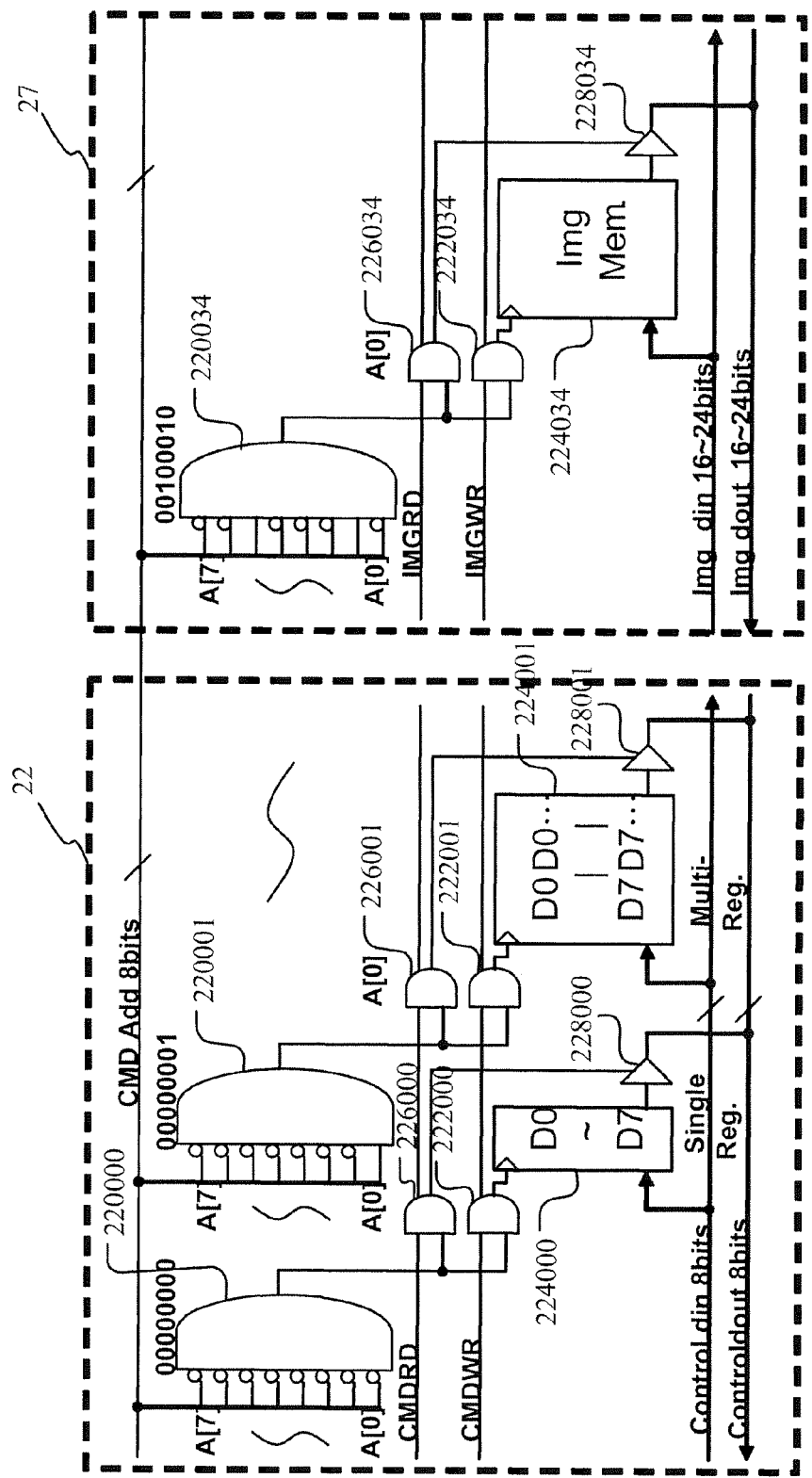
FIG. 5 shows the circuit diagram of the internal detailed circuit of the control register unit and the display memory unit according to the present invention.

FIG. 5 shows the circuit diagram of the internal detailed circuit of the control register unit and the display memory unit according to the present invention. As shown in the figure, the control register unit 22 and the display memory unit 27 according to the present embodiment comprise jointly a plurality of decoding units 220000~220255, a plurality of write logic units 222000~222255, a plurality of storage units 224000~224255, a plurality of read logic units 226000~226255, and a plurality of output units 228000~228255. According to the present embodiment, the storage address of the control register unit 22 and the display memory unit 27 is 8-bit. Thereby, there are 256 storage locations totally. Nonetheless, in other embodiments, the length of the storage is not limited to 8 bits; it can be 4, 7, or 16 bits.

Here, there is something requiring attention. Because the storage address of the control register unit 22 and the display memory unit 27 is 8-bit, there are 256 storage locations in total. Because the control register unit 22 and the display memory unit 27 share the 256 storage locations, a portion of the 256 storage locations is provided for the control register unit 22 while the rest portion is provided for the display memory unit 27. According to the present embodiment, the 34th storage location having 00100010 as the plurality of first information bits is provided for the display memory unit 27. At this time, instead of a register, the storage unit 224034 is a memory unit. The rest storage locations are all provided for the control register unit 22.

The plurality of decoding units 220000~220255 will all receives the plurality of first information bits, namely, the plurality of address bits. When one of the plurality of decoding units 220000~220255 decodes to the plurality of first information bits, a second decoding signal is output to the corresponding write logic unit or the read logic unit. For example, when the plurality of first information bits are 00000001, the output of the decoding unit 220001 will produce the second decoding signal. In other words, the decoding signal is the logic "1". The second decoding signal will be transmitted to the corresponding write logic unit 222001 or the read logic unit 226001.

At this time, when the write logic unit 222001 receives the parameter write signal CMDWR or the read logic unit 226001 receives the parameter read signal CMDRD, it will write the plurality of control parameter to the corresponding storage unit 224001 or read the plurality of control parameters from the corresponding storage unit 224001. According to the present embodiment, because the decoding unit 220001 decodes the plurality of first information bits to the plurality of parameter addresses, the storage unit 224001 is a register, in particularly, a multi register, for storing the plurality of control parameters having more than one byte. Besides, when the plurality of control parameters are parameters less than one byte, only a single register is required for the storage unit, which is just the storage unit 224000 shown in FIG. 5.

The plurality of storage units 224000~224033, 224035~224255 used by the control register unit 22 are coupled to the plurality of write logic units 222000~222033 222035~222255 and the selection unit 2146, respectively. In other words, the clock terminals of the plurality of storage units 224000~224033, 224035~224255 are coupled to the plurality of write logic units 222000~222033, 222035~222255, respectively; and the inputs of the plurality of storage units 224000~224033, 224035~224255 are coupled to the selection unit 2146. When one of the plurality of write logic units 222000~222033, 222035~222255, for example, the write logic unit 222001, receives the second decoding signal and the parameter write signal CMDWR, the write logic unit 222001 produces a write clock signal to the corresponding storage unit 224001. At this time, the selection unit 2146 transmits the plurality of control parameters correspondingly and writes to the corresponding storage unit 224001.

Likewise, the storage unit 224034 used by the display memory unit 27 is coupled to the write logic unit 222034 and the first data latch unit 2148. When the write logic unit 222034 receives the second decoding signal and the data write signal IMGWR, the write logic unit 222034 produces a write clock signal to the corresponding storage unit 224034. Then, the first data latch unit 2148 transmits the plurality of display data correspondingly arid writes to the corresponding storage unit 224034.

The plurality of output units 228000~228255 are coupled to the outputs of the plurality of storage units 224000~224255, respectively; the enable terminals of the output units 228000~228255 are coupled to the plurality of read logic units 226000~226255, respectively. When one of the plurality of read logic units 226000~226255 receives, in addition to the second decoding signal, the parameter read signal CMDRD or the data read signal IMGRD, for example, the read logic unit 226001 receives the second decoding signal and the parameter read signal CMDRD, the read logic unit 226001 produces and transmits a read enable signal to the corresponding output unit 228001 for reading the plurality of control parameters stored in the corresponding register unit 224001 to the main processor 1. According to the above description, the storing and reading method inside the display memory unit 27 is similar to that inside the control register unit 22. Hence, the details will not be described here.

Besides, the details of the processing unit 214 transmitting the control parameters and the display data to the control register unit 22 and the display memory unit 27, respectively, will be described in the following.

Figure 6:
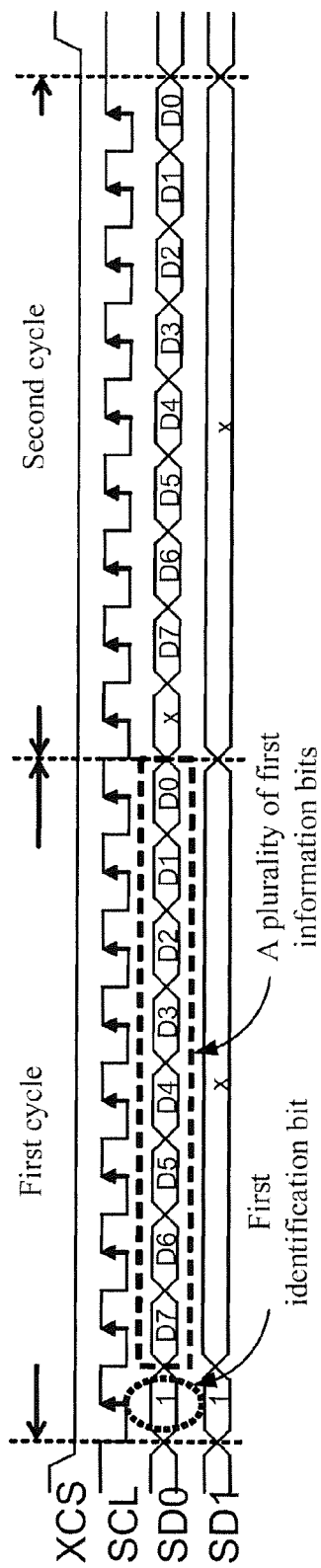
FIG. 6 shows the waveforms of the first and second transmission lines according to a first embodiment of the present invention.

FIG. 6 shows the waveforms of the first and second transmission lines according to a first embodiment of the present invention. As shown in the figure, in the present embodiment, the transmission interface is used for reading the control parameters of the display driving circuit 2 to the main processor 1. In the first cycle, the first transmission line SD0 transmits a first data string; the second transmission line SD1 transmits a second data string. In the second cycle, the first transmission line SD0 transmits a third data string; the second transmission line SD1 transmits a fourth data string, and so on. According to the present embodiment, the data strings transmitted by the first and second transmission lines SD0, SD1 in each cycle is 9-bit. In the first cycle, the ninth bit is the first identification bit used for identifying either to read or to write. In the present embodiment, if the first identification bit is the logic "1", it means to read. On the contrary, if the first identification bit is the logic "0", it means to write. In the first reading cycle, namely, the first cycle, the first to the eighth bits are the plurality of first information bits. The address decoding unit 2142 can identify the plurality of first information bits and thus knowing it being parameter type or data type. In the present embodiment, it is parameter type. Furthermore, according to the second identification bit in the second data string received by the second transmission line SD1, whether the transmitted parameters or data have a single byte or multiple bytes can be determined. According to the present embodiment, the second identification bit is the logic "1". Thereby, the transmitted parameters or data have a single byte. In the second reading cycle, namely, the second cycle, the first to the eighth bits transmitted by the first transmission line SD0 are the control parameters. The transmission interface 20 reads these control parameters to the main processor 1 and hence completing the reading action.

In addition, when the second identification bit is the logic "1", the plurality of control parameters can also be placed to the plurality of second information bits located at the first to the eighth bits of the second data string of the second transmission line SD1.

Figure 7:
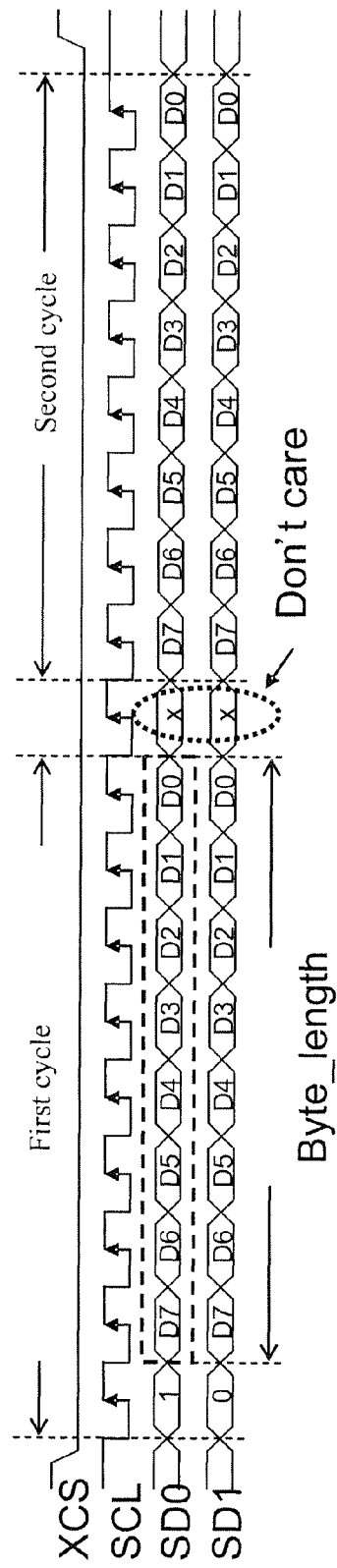
FIG. 7 shows the waveforms of the first and second transmission lines according to a second embodiment of the present invention.

FIG. 7 shows the waveforms of the first and second transmission lines according to a second embodiment of the present invention. As shown in the figure, the difference between the present embodiment and the one in FIG. 6 is that although the present embodiment is also parameter type, the second identification bit is the logic "0". Thereby, the transmitted parameters or data have multiple bytes. Accordingly, the second information bit in the first cycle determines the byte length of the subsequent control parameters. In the present embodiment, if the second information bit is 2, it means that, in the second cycle, the 8 bits of the first data string in the first transmission line SD0 and the 8 bits of the second data string in the second transmission line SD1 are all control parameters.

Besides, because the present embodiment reads the control parameters, in the first cycle, the main processor 1 transmits the plurality of first information bits and the plurality of second information bits to the transmission interface via the first and second transmission line SD0, SD1. In the second cycle, the main processor 1 reads the plurality of control parameters from the control register unit 22.

Figure 8:
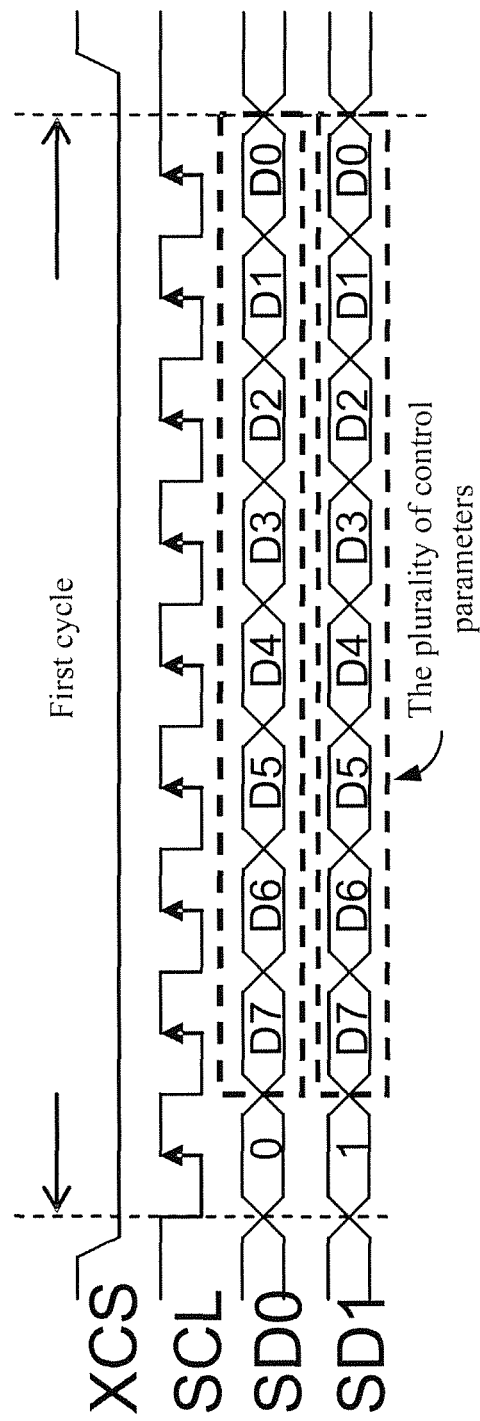
FIG. 8 shows the waveforms of the first and second transmission lines according to a third embodiment of the present invention.

FIG. 8 shows the waveforms of the first and second transmission lines according to a third embodiment of the present invention. As shown in the figure, the difference between the present embodiment and the previous one that, according to the present embodiment, the main processor 1 writes the control parameters to the control register unit 22. That is to say, the first transmission line SD0 transmits to the ninth bit of the transmission interface 20 in the first write cycle, namely, the first cycle. In the present embodiment, the first identification bit is the logic "0" and the first information bits of the first to the eighth bits are identified as the control parameter address. Thereby, the transmission interface 20 will use the control parameter address to write the control parameter to the control register unit 22. In other words, according to the second identification bit of the ninth bit of the second transmission line SD1, the transmission interface 20 can know the state of the subsequent control parameters. It means that when the second identification bit of the ninth bit of the second transmission line SD1 in the first write cycle is the logic "1", the second information bits of the first to the eighth bits of the second transmission line SD1 are control parameters; these control parameters are written to the control register unit 22.

Figure 9:
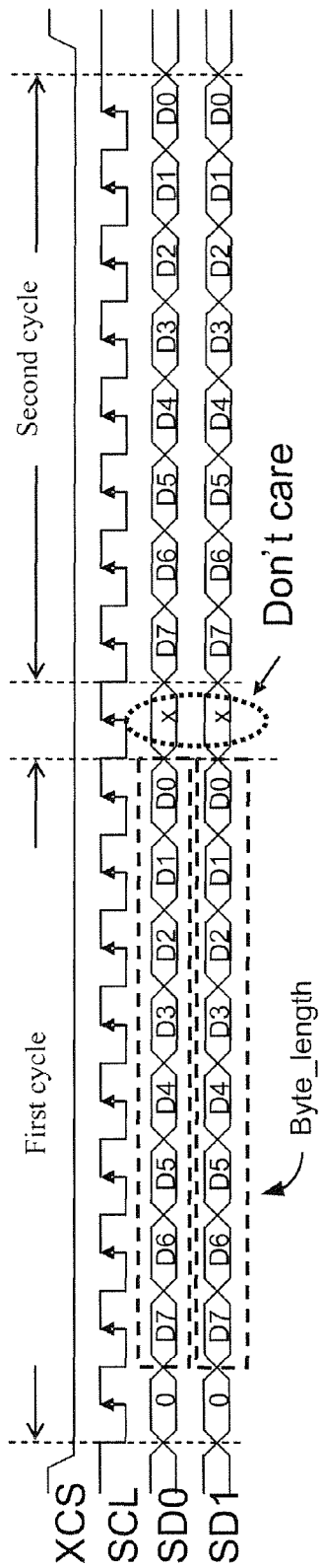
FIG. 9 shows the waveforms of the first and second transmission lines according to a fourth embodiment of the present invention.

FIG. 9 shows the waveforms of the first and second transmission lines according to a fourth embodiment of the present invention. As shown in the figure, the difference between the present embodiment and the previous one is that when the second identification bit of the ninth bit in the first write cycle, namely, the first cycle, is the logic "0", it means that the second information bit of the first to the eight bits of the second transmission line SD1 is the byte length of the subsequent control parameters. In other words, the main processor 1 informs the transmission interface 20 the byte length for transmitting the control parameters to the control register unit 22. As shown in FIG. 8, according to the first to the eighth bits of the second transmission line SD1 in the first write cycle, namely, the first cycle, the byte length of the transmitted control parameters by the first and second transmission lines SD0, SD1 in the subsequent cycles is known. For example, the first to the eight bits of the second transmission line SD1 in the first write cycle, namely, the first cycle, are "00000001". It is thereby known that the byte length of the control parameter written subsequently is 8. On the other hand, if the first to the eight bits are "00000010", the byte length is 16, and so on. If the first to the eight bits of the second transmission line SD1 are "00000010", the first and second transmission lines SD0, SD1 will transmit 8-bit control parameters to the transmission interface 20 in the second write cycle, respectively, so that the transmission interface 20 can write a 16-bit control parameter to the control register unit 22.

Figure 10:
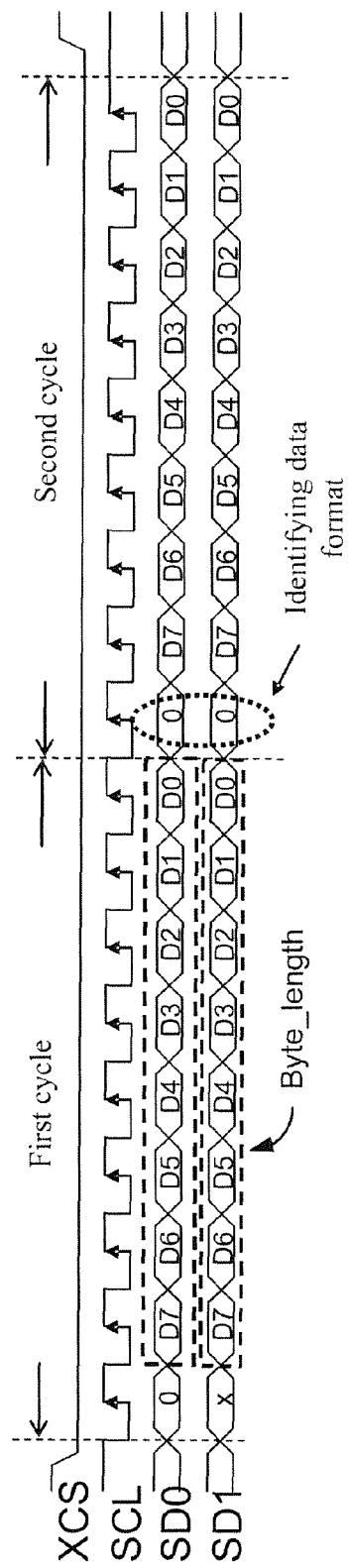
FIG. 10 shows the waveforms of the first and second transmission lines according to a fifth embodiment of the present invention.

FIG. 10 shows the waveforms of the first and second transmission lines according to a fifth embodiment of the present invention. As shown in the figure, the difference between the present embodiment and the previous one is that the present embodiment describes writing display data to the display memory unit 27. The transmission interface 20 in the present embodiment knows writing action according to the ninth bit of the first transmission line SD0 in the first cycle and knows display data from the second information bits of the first to the eighth bits. Thereby, the transmission interface will know to perform writing display data to the display memory unit 27.

Figure 11:
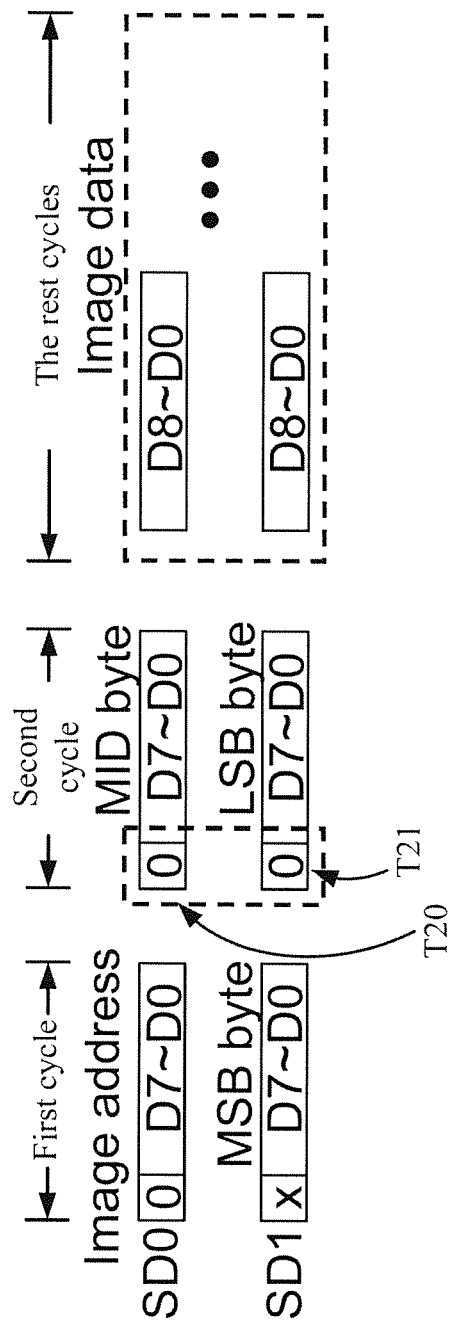
FIG. 11 shows the schematic diagram of selecting data format in FIG. 9.

Next, please also refer to FIG. 11. The first to the eighth information bits transmitted by the second transmission line SD1 in the first cycle determine the byte length of the subsequent display data. On the other hand, the ninth bit of the first and second transmission lines SD0, SD1, namely, T20 and T21, determine the data format for transmission of the subsequent display data. For example, when T20 and T21 are both the logic "0", it means that the data format is 16 bits (65K color mode); when T20 and T21 are the logic "0" and "1", respectively, the data format is 18 bits (262K color mode); when T20 and T21 are the logic "1" and "0", respectively, the data format is the first 24-bit mode (16M color mode 1); and when T20 and T21 are both the logic "1", the data format is the second 24-bit mode (16M color mode 2).

Figure 12:
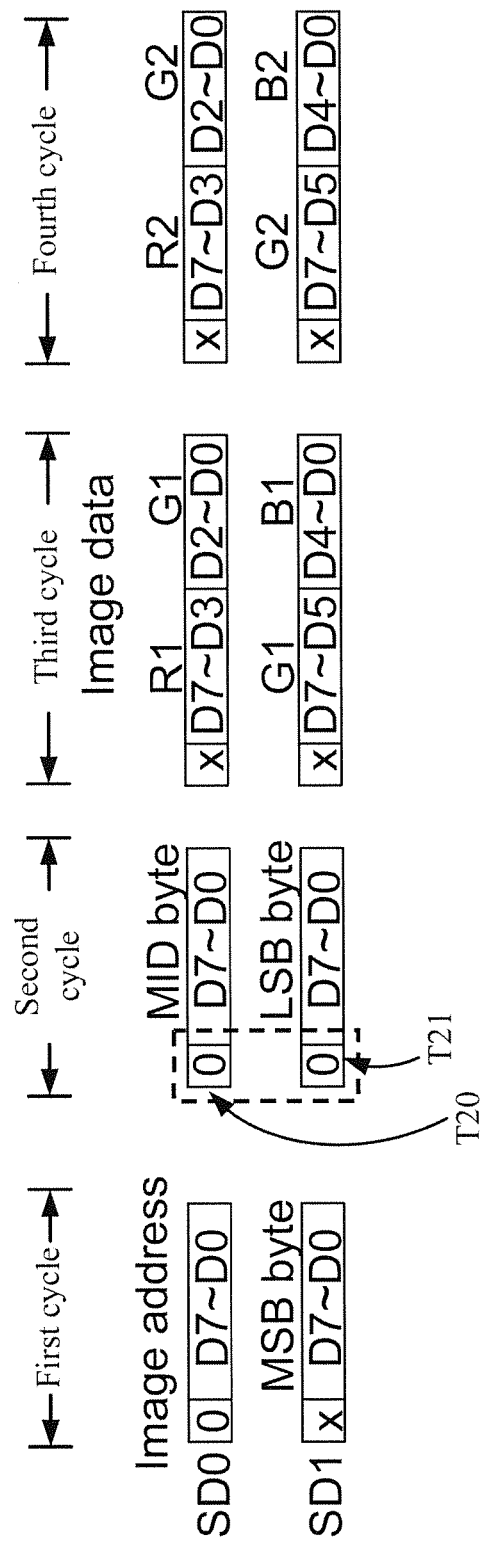
FIG. 12 shows a schematic diagram of data format transmission according the first embodiment of the present invention.

FIG. 12 shows a schematic diagram of data format transmission according the first embodiment of the present invention. As shown in the figure, the ninth bits of the first and second transmission lines SD0, SD1 in the second cycle are both the logic "0", which means that the data format for subsequent display data transmission is 16 bits (65K color mode). In other words, in the subsequent display data, the numbers of bits for the red, green, and blue data of a pixel are 5, 6, and 5, respectively. As shown in FIG. 12, in the third cycle of the first and second transmission lines SD0, SD1, the red data R1 of the first pixel are the D7~D3 bits of the first transmission line SD0, which include 5 bits totally; the green data G1 of the first pixel are the D2~D0 bits of the first transmission line SD0 and the D7~D5 bits of the second transmission line SD1, which include 6 bits totally; and the blue data B1 of the first pixel are the D4~D0 bits of the second transmission line SD1, which include 5 bits totally. Thereby, the first and second transmission lines SD0, SD1 complete transmission for the data of a pixel.

In addition, as for how many pixel data do the first and second transmission lines SD0, SD1 need to transmit, the length or number of the display data needed to be transmitted in total can be determined according to the D7~D0 bits of the second transmission line SD1 in the first cycle, the D7~D0 bits of the first transmission line SD0 in the second cycle, and the D7~D0 bits of the second transmission line SD1 in the second cycle. The D7~D0 bits of the second transmission line SD1 in the first cycle are the MSB byte; the D7~D0 bits of the first transmission line SD0 in the second cycle are the MID byte; the D7~D0 bits of the second transmission line SD1 in the second cycle is the LSB byte. For example, if the 24-bit information formed by jointing the MSB byte, the MID byte, and the LSB byte represents the decimal 20, it means that the first and second transmission lines SD0, SD1 transmit display data from the third to the twelfth cycle, which include ten cycles totally. According to another possible embodiment, the decimal 20 means that the first and second transmission lines SD0, SD1 transmit display data from the third to the twenty-second cycle, which include twenty cycles totally. According to still another possible embodiment, the decimal 20 means that the first and second transmission lines SD0, SD1 need to transmit 20 blue data, 20 red data, and 20 green data after the second cycle. According to still another possible embodiment, the decimal 20 means that the first and second transmission lines SD0, SD1 need to transmit 20 pixel data after the second cycle.

Figure 13:
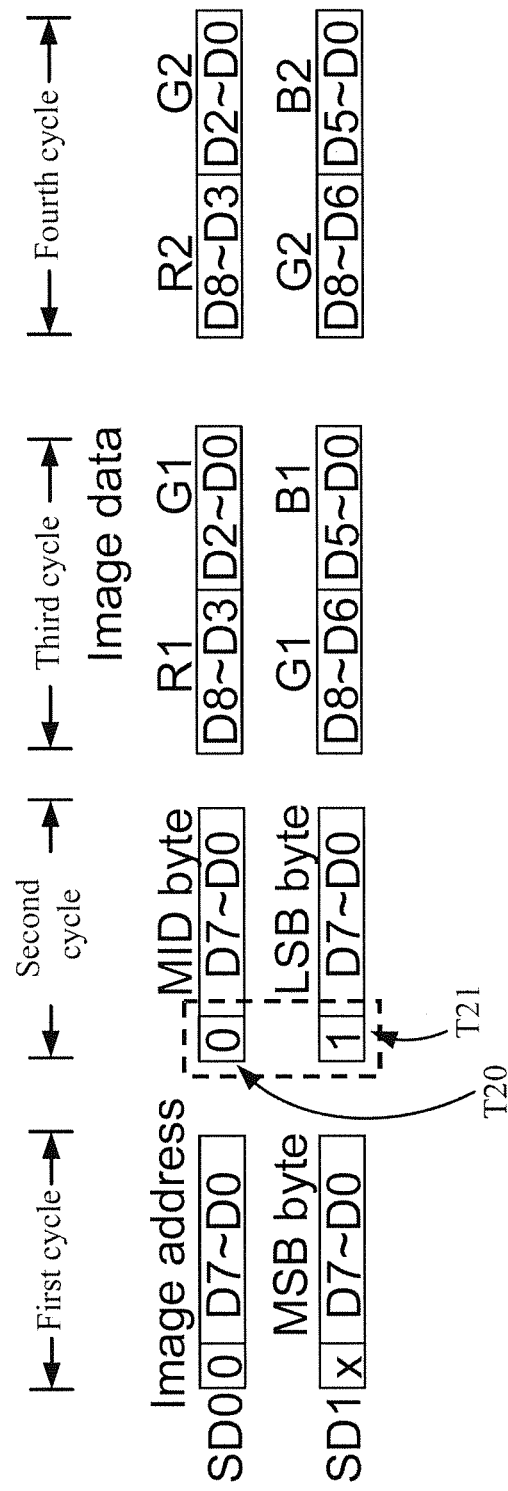
FIG. 13 shows a schematic diagram of data format transmission according the second embodiment of the present invention.

FIG. 13 shows a schematic diagram of data format transmission according the second embodiment of the present invention. As shown in the figure, the difference between the present embodiment and the one in FIG. 11 is that the ninth bits of the first and second transmission lines SD0, SD1 according to the present embodiment are the logic "0" and "1", respectively, in the second cycle, meaning that the data format for subsequent display data transmission is 18 bits (262K color mode). Namely, the red data in the pixel data have 6 bits; the green data have 6 bits; and the blue data have 6 bits. The rest is similar to the embodiment in FIG. 11, and hence the details will not be described again.

Figure 14:
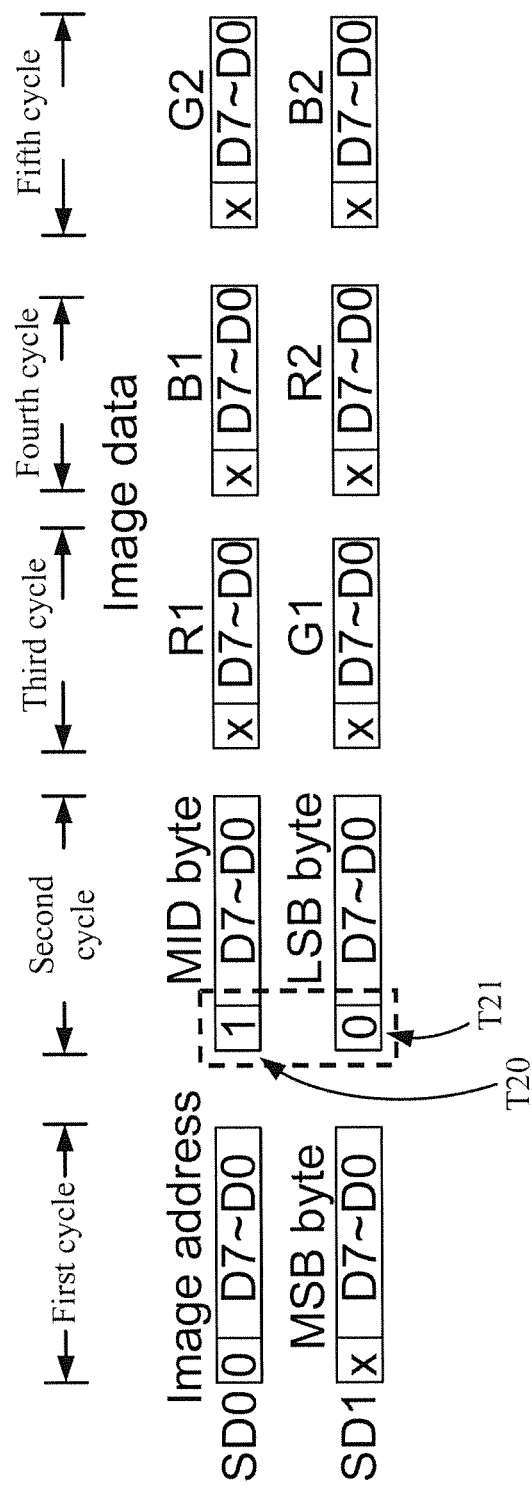
FIG. 14 shows a schematic diagram of data format transmission according the third embodiment of the present invention.

FIG. 14 shows a schematic diagram of data format transmission according the third embodiment of the present invention. As shown in the figure, the difference between the present embodiment and the previous one is that the ninth bits of the first and second transmission lines SD0, SD1 according to the present embodiment are the logic "1" and "0", respectively, in the second cycle, meaning that the data format for subsequent display data transmission is 24 bits (16M color mode 1). Namely, the red data in the pixel data have 8 bits; the green data have 8 bits; and the blue data have 8 bits. The rest is similar to the embodiment in FIG. 11, and hence the details will not be described again.

Figure 15:
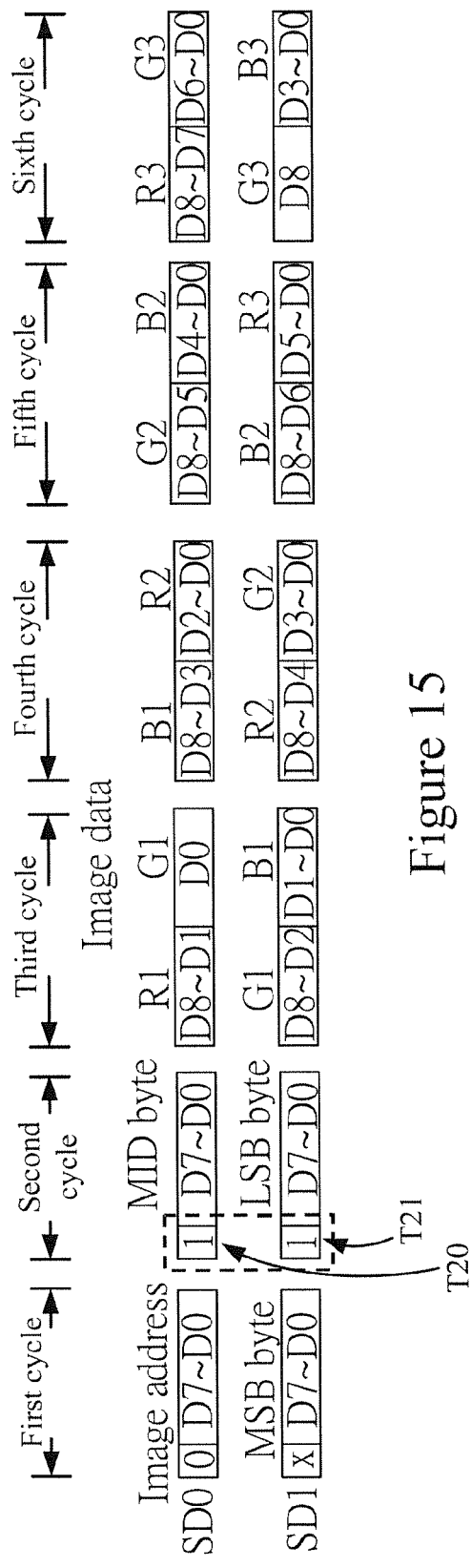
FIG. 15 shows a schematic diagram of data format transmission according the fourth embodiment of the present invention.

FIG. 15 shows a schematic diagram of data format transmission according the fourth embodiment of the present invention. As shown in the figure, the difference between the present embodiment and the previous one is that the ninth bits of the first and second transmission lines SD0, SD1 according to the present embodiment are the logic "1" and "1", respectively, in the second cycle, meaning that the data format for subsequent display data transmission is 24 bits (16M color mode 2). Namely, the red data in the pixel data have 8 bits; the green data have 8 bits; and the blue data have 8 bits. According to the present embodiment, the ninth bits of the first and second transmission lines SD0, SD1 are used for transmitting display data. As shown in FIG. 15, the red data R1 of the first pixel data have 8 bits in total, including D8~D1 of the first transmission line SD0 in the third cycle; the green data G1 of the first pixel data have 8 bits in total, including D0 of the first transmission line SD0 and D8~D2 of the second transmission line SD1 in the third cycle; and the blue data B1 of the first pixel data have 8 bits in total, including D1~D0 of the second transmission line SD1 in the third cycle and D8~D3 of the first transmission line SD0 in the fourth cycle.

Moreover, when the second pixel data are transmitting, they are transmitted following the first pixel data. In other words, the red data R2 of the second pixel data have 8 bits in total, including D2~D0 of the first transmission line SD0 and D8~D4 of the second transmission line SD1 in the fourth cycle; and the green data G2 of the second pixel data have 8 bits in total, including D3~D0 of the second transmission line SD1 in the fourth cycle and D8~D5 of the first transmission line SD0 in the fifth cycle, and so on. The method for transmitting display data by the first and second transmission lines SD0, SD1 according to the present embodiment uses the nine bits of the transmissions completely for increasing the transmission rate.

Figure 16:
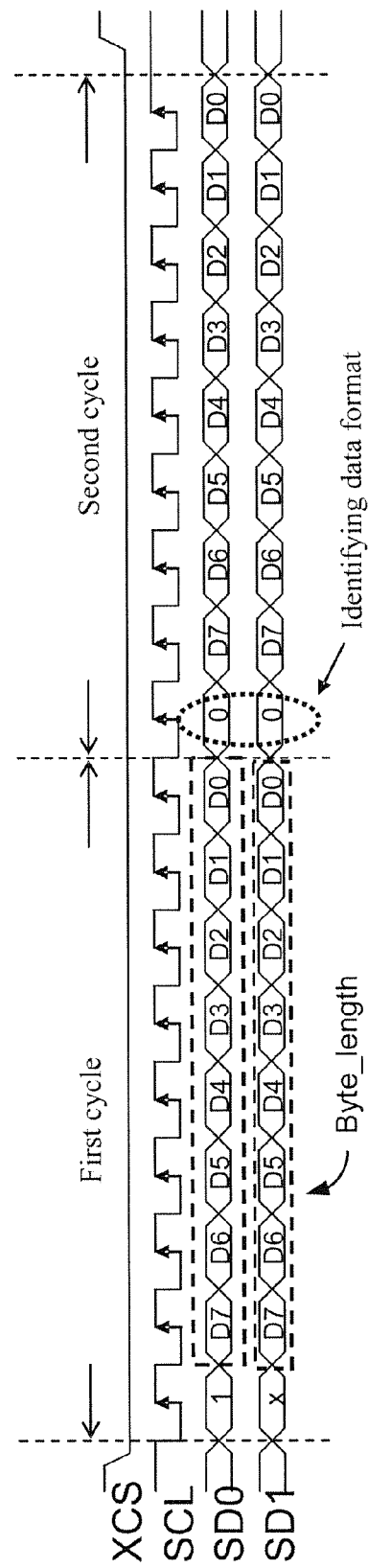
FIG. 16 shows the waveforms of the first and second transmission lines according to a sixth embodiment of the present invention.

FIG. 16 shows the waveforms of the first and second transmission lines according to a sixth embodiment of the present invention. As shown in the figure, the difference between the present embodiment and the one in FIG. 8 is that, according to the present embodiment, display data is read to the main processor 1. In other words, the ninth bit of the first transmission line SD0 in the first cycle is the logic "1". The rest is the same as the embodiment in FIG. 8, and hence the details will not be described.

To sum up, the transmission interface according to the present invention comprises a first input, a second input, and a processing unit. The transmission method of the transmission interface is that the first input is used for receiving a first data string; the second input is used for receiving a second data string; and the processing unit receives the first and second data strings. The first data string has a first identification bit and a plurality of first information bits. The second data string has a plurality of second information bits. The processing unit identifies either to write a plurality of parameters or a plurality of data to a storage circuit or to read the stored content from the storage circuit according to the first identification bit and the plurality of first information bits. The processing circuit further writes or reads the storage circuit according to the plurality of second information bits. Thereby, a first input and a second input according to the present invention are used for transmitting bulk data in the same time for achieving the purpose of transmitting data rapidly and further improving the transmission efficiency.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A transmission interface, comprising:
   a first input terminal for receiving a first data string;
   a second input terminal for receiving a second data string; and
   a processing unit receiving said first data string and said second data string,
   said first data string including a first identification bit and a plurality of first information bits, and said second data string including a plurality of second information bits,
   wherein said first information bits are representative of data selected from a group of data types consisting of a plurality of control parameters and addresses thereof or a plurality of display data and addresses thereof,
   wherein said processing unit is configured:
   (a) to decode said first information bits, thus determining a data type in said first information bits being control parameters or display data and to produce a decoding signal indicative of the determined data type,
   (b) to distinguish between writing said plurality of control parameters or said plurality of display data to a storage circuit or reading the stored content from said storage circuit based on said first identification bit,
   (c) to produce, responsive to said decoding signal, a respective write or read command signal for the determined data type being control parameters or display data, and
   (d) to write to or to read from said storage circuit according to said plurality of second information bits and based on said write or read command signals applied to said determined control parameters or display data, said first data string being different from said second data string.

2. The transmission interface of claim 1, wherein said second data string further comprises a second identification bit, and said processing unit identifies said plurality of second information bits being the length of said plurality of control parameters or the length of said plurality of display data according to said second identification bit.

3. The transmission interface of claim 2, wherein said processing unit comprises:
   an address decoding unit, used for receiving said plurality of first information bits, identifying said plurality of first information bits being the storage address of said plurality of control parameters in said storage circuit or the storage address of said plurality of display data in said storage circuit, and producing said decoding signal; and
   a clock control unit, coupled to said address decoding unit, and producing a selection signal and a latch signal according to said first identification bit, said second identification bit, and said decoding signal.

4. The transmission interface of claim 3, wherein said processing unit further comprises:
   a selection unit, coupled to said clock control unit, transmitting said plurality of control parameters to said storage circuit according to said plurality of first information bits, said plurality of second information bits, and said selection signal; and
   a data latch unit, coupled to said clock control unit, and transmitting said plurality of display data to said storage circuit according to said plurality of first information bits, said plurality of second information bits, and said latch signal.

5. The transmission interface of claim 3, wherein said processing unit further comprises an address latch unit, receiving said plurality of first information bits, and transmitting said plurality of first information bits to said storage circuit according to an address command signal transmitted by said clock control unit.

6. The transmission interface of claim 3, and further comprising:
   a first shift register unit, used for registering said first identification bit and said plurality of first information bits, and outputting said first identification bit and said plurality of first information bits to said address decoding unit and said clock control unit, respectively, afterwards; and
   a second shift register unit, used for registering said second identification bit and said plurality of second information bits of said second data string.

7. The transmission interface of claim 1, and further comprising:
   a first shift register unit, used for registering said first identification bit and said plurality of first information bits; and
   a second shift register unit, used for registering a second identification bit and said plurality of second information bits of said second data string.

8. The transmission interface of claim 7, and further comprising an input/output unit, coupled to said first input terminal and said second input terminal, transmitting said first identification bit and said plurality of first information bits of said first data string to said first shift register unit, and transmitting said second identification bit and said plurality of second information bits of said second data string to said second shift register unit.

9. The transmission interface of claim 7 and further comprising:
   a first latch unit, used for latching said first identification bit and said plurality of first information bits output by said first shift register unit, and outputting said first identification bit and said plurality of first information bits to said processing unit; and
   a second latch unit, used for latching said second identification bit and said plurality of second information bits output by said second shift register unit, and outputting said second identification bit and said plurality of second information bits to said processing unit.

10. The transmission interface of claim 9, and further comprising:
    a logic circuit, coupled to an enable line and a clock line, producing a second clock signal according to an enable signal of said enable line and a clock signal of said clock line, and transmitting said second clock signal to said first shift register unit and said second shift register unit as the clock of said first shift register unit and said second shift register unit; and a frequency dividing unit, coupled to said logic circuit, dividing the frequency of said second clock signal and producing a frequency dividing signal, and transmitting said frequency dividing signal to said first latch unit and said second latch unit as the clock of said first latch unit and said second latch unit.

11. A transmission method, comprising steps of:

transmitting a first identification bit and a plurality of first information bits of a first data string to a transmission interface;

transmitting a plurality of second information bits of a second data string to said transmission interface;

wherein said first information bits are representative of data selected from a group of data types consisting of a plurality of control parameters and addresses thereof or a plurality of display data and addresses thereof;

determining a respective data type in said first information bits being control parameters or display data by decoding said first information bits and producing a decoding signal indicative of the determined data type;

distinguishing between writing said plurality of control parameters or said plurality of display data to a storage circuit or reading the stored content from said storage circuit based on said first identification bit;

producing, responsive to said decoding signal, a respective write or read command signal for the determined data type being control parameters or display data; and writing to or reading from said storage circuit according to said plurality of second information bits and based on said write or read command signal applied to said determined control parameters or display data.

12. The transmission method of claim 11, wherein said step of distinguishing between writing said plurality of control parameters or said plurality of display data to a storage circuit or reading the stored content form said storage circuit according to said first identification bit and said plurality of first information bits is to identify the address of said storage circuit for storing a plurality of control parameters or the address of said storage circuit for storing a plurality of display data according to said plurality of first information bits, and determine to read or to write said storage circuit according to said first identification bit.

13. The transmission method of claim 11, and further comprising a step of identifying said plurality of second information bits being the length of said plurality of control parameters or the length of said plurality of data according to second identification bit.

14. The transmission method of claim 13, wherein in a first cycle, identify either to write said plurality of control parameters or said plurality of display data to said storage circuit or to read the stored content from said storage circuit according to said first identification bit and said plurality of first information bits; and in a second cycle, determine the data format of said plurality of display data according to said first identification bit and said second identification bit.

15. A driving circuit, comprising a transmission interface, having a first input terminal and a second input terminal, said first input terminal receiving a first data string, said second input terminal receiving a second data string, said first data string being different from said second data string, said first data string having a first identification bit and a plurality of first in formation bits, said second data string having a plurality of second information bits, wherein said first information bits are representative of data selected from a group of data types consisting of a plurality of control parameters and addresses thereof or a plurality of display data and addresses thereof, wherein said transmission interface is configured to:

(a) decode said first information bits, thus determining a data type in said first information bits being control parameters or display data and to produce a decoding signal indicative of the determined data type;

(b) distinguish between writing said plurality of control parameters or said plurality of display data to a storage circuit or reading the stored content from said storage circuit based on said first identification bit;

(c) produce, responsive to said decoding signal, a respective write or read command signal for the determined data type being control parameters or display data; and (d) write to or read from said storage circuit according to said plurality of second information bits and based on said write or read command signals applied to said determined control parameters or display data.

16. The driving circuit of claim 15, wherein said second data string further comprises a second identification bit, and said transmission interface identifies said plurality of second information bits being the length of said plurality of control parameters or the length of said plurality of display data according to said second identification bit.

17. The driving circuit of claim 15, and further comprising:

a timing control unit, used for producing a timing signal;

a scan driving unit, coupled to said timing control unit, producing a scan signal according to said timing signal and said plurality of control parameters stored in said storage circuit, and transmitting said scan signal to a display panel for driving at least one of a plurality of scan lines of said display panel; and a data driving module, coupled to said timing control unit, producing a plurality of data signals according to said timing signal and said plurality of display data stored in said storage circuit, and transmitting said plurality of data signals to said display panel for driving a plurality of data lines of said display panel.

18. The driving circuit of claim 17, wherein said transmission interface comprises:

an address decoding unit, used for receiving said plurality of first information bits, identifying said plurality of first information bits being the storage address of said plurality of control parameters in said storage circuit or the storage address of said plurality of display data in said storage circuit, and producing said decoding signal; and a clock control unit, coupled to said address decoding unit, and producing a selection signal and a latch signal according to said first identification bit, second identification bit, and said decoding signal for controlling said scan driving unit to produce said scan signal or controlling said data driving module to produce said plurality of data signals.

19. A display device, comprising:

a driving circuit driving said display device; and a transmission interface having a first input terminal and a second input terminal, said first input terminal receiving a first data string, said second input terminal receiving a second data string, said first data string being different from said second data string, said first data string having a first identification bit and a plurality of first information bits, and said second data string having a plurality of second information bits;

wherein said first information bits are representative of data selected from a group of data types consisting of a plurality of control parameters and addresses thereof or a plurality of display data and addresses thereof;

wherein said transmission interface is configured to:

(a) decode said first information bits, thus determining a data type in said first information bits being control parameters or display data, and produce a decoding signal indicative of the determined data type;

(b) distinguish between writing said plurality of control parameters or a said plurality of display data to a storage circuit or reading the stored content from said storage circuit based on said first identification bit;

(c) produce, responsive to said decoding signal, a respective write or read command signal for the determined data type being control parameters or display data; and (d) write to or read from said storage circuit according to said plurality of second information bits and based on said write or read command signals applied to said determined control parameters or display data.

20. The display device of claim 19, wherein said second data string further comprises a second identification bit, and said transmission interface identifies said plurality of second information bits being the length of said plurality of control parameters or the length of said plurality of display data according to said second identification bit.

21. The display device of claim 19, and further comprising:

a timing control unit, used for producing a timing signal;

a scan driving unit, coupled to said timing control unit, producing a scan signal according to said timing signal and said plurality of control parameters stored in said storage circuit, and transmitting said scan signal to a display panel for driving at least one of a plurality of scan lines of said display panel; and a data driving module, coupled to said timing control unit, producing a plurality of data signals according to said timing signal and said plurality of display data stored in said storage circuit, and transmitting said plurality of data signals to said display panel for driving a plurality of data lines of said display panel.

22. The display device of claim 21, wherein said transmission interface comprises:

an address decoding unit, used for receiving said plurality of first information bits, identifying said plurality of first information bits being the storage address of said plurality of control parameters in said storage circuit or the storage address of said plurality of display data in said storage circuit, and producing said decoding signal; and a clock control unit, coupled to said address decoding unit, and producing a selection signal and a latch signal according to said first identification bit, said second identification bit, and said decoding signal for controlling said scan driving unit to produce said scan signal or controlling said data driving module to produce said plural of data signals.

23. An electronic device, comprising:

a main processor producing a first data string and a second data string;

a driving circuit driving a display panel according to said first data string and said second data string; and a transmission interface, having a first input terminal and a second input terminal, said First input terminal receiving said first data string, said second input terminal receiving said second data string, said first data string being different from said second data string, said first data string having a first identification bit and a plurality of first information bits, said second data string having a plurality of second information bits;

wherein said first information bits are representative of data selected from a group of data types consisting of a plurality of control parameters and addresses thereof or a plurality of display data and addresses thereof;

wherein said transmission interface is configured to:

(a) decode said first information bits, thus determining a data type in said first information bits being control parameters or display data, and produce a decoding signal indicative of the determined data type;

(b) distinguish between writing said plurality of control parameters or said plurality of display data to a storage circuit or reading the stored content from said storage circuit based on said first identification bit;

(c) produce, responsive to said decoding signal, a respective write or read command signal for the determined data type being control parameters or display data; and (d) write to or read from said storage circuit according to said plurality of second information bits and based on said write or read command signals applied to said determined control parameters or display data.

24. The electronic device of claim 23, wherein said second data string further comprises a second identification bit, and said transmission interface identifies said plurality of second information bits being the length of said plurality of control parameters or the length of said plurality of display data according to said second identification bit.

25. The electronic device of claim 23, wherein said driving circuit comprises:

a timing control unit, used for producing a timing signal;

a scan driving unit, coupled to said timing control unit, producing a scan signal according to said timing signal and said plurality of control parameters stored in said storage circuit, and transmitting said scan signal to said display panel for driving at least one of a plurality of scan lines of said display panel; and a data driving module, coupled to said timing control unit, producing a plurality of data signals according to said timing signal and said plurality of display data stored in said storage circuit, and transmitting said plurality of data signals to said display panel for driving a plurality of data lines of said display panel.

26. The electronic device of claim 25, wherein said transmission interface comprises:

an address decoding unit, used for receiving said plurality of first information bits, identifying said plurality of first information bits being the storage address of said plurality of control parameters in said storage circuit or the storage address of said plurality of display data in said storage circuit, and producing said decoding signal; and a clock control unit, coupled to said address decoding unit, and producing a selection signal and a latch signal according to said first identification bit, said second identification bit, and said decoding signal for controlling said scan driving unit to produce said scan signal or controlling said data driving module to produce said plurality of data signals.

* * * * *